(12) United States Patent
Åkerberg

(10) Patent No.: US 6,483,826 B1
(45) Date of Patent: Nov. 19, 2002

(54) UTILIZATION OF PLURAL MULTIPLE ACCESS TYPES FOR MOBILE TELECOMMUNICATIONS

(75) Inventor: Dag E:son Åkerberg, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/252,990

(22) Filed: Feb. 19, 1999

(51) Int. Cl.[7] .................................................. H04J 13/00
(52) U.S. Cl. ......................... 370/335; 370/337; 455/426
(58) Field of Search ................................ 370/335, 342, 370/320, 337, 347, 321; 455/62, 63, 422, 476, 446, 561

(56) References Cited

U.S. PATENT DOCUMENTS

| | | | | |
|---|---|---|---|---|
| 5,481,533 A | * | 1/1996 | Honig et al. | 370/335 |
| 5,511,068 A | * | 4/1996 | Sato | 370/335 |
| 5,533,013 A | * | 7/1996 | Leppanen | 370/342 |
| 5,894,500 A | * | 4/1999 | Dent | 370/320 |
| 6,219,347 B1 | * | 4/2001 | Uchida et al. | 370/342 |
| 6,381,461 B1 | * | 4/2002 | Besson et al. | 370/335 |

FOREIGN PATENT DOCUMENTS

| | | |
|---|---|---|
| EP | 0 652 680 A2 | 5/1995 |
| WO | 07/36443 | 10/1997 |

OTHER PUBLICATIONS

ETR 310: Annex E: DECT Instance DCS Procedures, Aug. 1996, pp. 69–74.

Åkerberg, Novel Radio Access Principles Useful for Third Generation Mobile Radio Systems, PIMRC '92, the Third IEEE International Symposium on Personal, Indoor and Mobile Radio Communications Proceedings, Oct. 19–21, 1992, pp. 4–9.

* cited by examiner

Primary Examiner—Lester G. Kincaid
(74) Attorney, Agent, or Firm—Nixon & Vanderhye, P.C.

(57) ABSTRACT

A first telecommunications system ($20_1$) has at least partially geographically overlapping coverage with a second telecommunications system ($20_2$), with radio transmission access in the first telecommunications system utilizing code division multiple access (CDMA) with a time division multiple access (TDMA) component. A base station (BS) of the first telecommunications system communicates over an air interface with a subscriber station (SS) and broadcasts a common broadcast physical channel (BPCH) on at least an active carrier/timeslot combination (C/TS). The common broadcast physical channel includes broadcast system identity information. The subscriber station uses the broadcast system identity information to distinguish between transmissions of the first telecommunications system and the second telecommunications system. Moreover, the subscriber station uses the broadcast system identity information for framing transmissions in the first telecommunications system. The base station of the first system broadcasts at least two common broadcast physical channels active on different timeslots. Preferably, a fixed direct sequence CDMA code is employed for the common broadcast physical channel. In accordance with an instant dynamic channel selection procedure of the present invention, the subscriber station selects a carrier/timeslot for sending an access request to the first system base station. The carrier/timeslot selected by the first system subscriber station for sending an access request to the first system base station is also used for a traffic channel. Preferably, the first system subscriber station selects a least interfered carrier/timeslot as the carrier/timeslot for sending an access request to the first system base station. In response to the access request, the first system base station sends an answer on a next downlink carrier/timeslot included in a duplex pair with the carrier/time slot which the first system subscriber station selected for sending the access request to the first system base station. At an given moment a connection between the first system base station and the subscriber station is borne on a physical channel of the first telecommunications system, the physical channel being defined by a code, timeslot, and frequency.

66 Claims, 10 Drawing Sheets

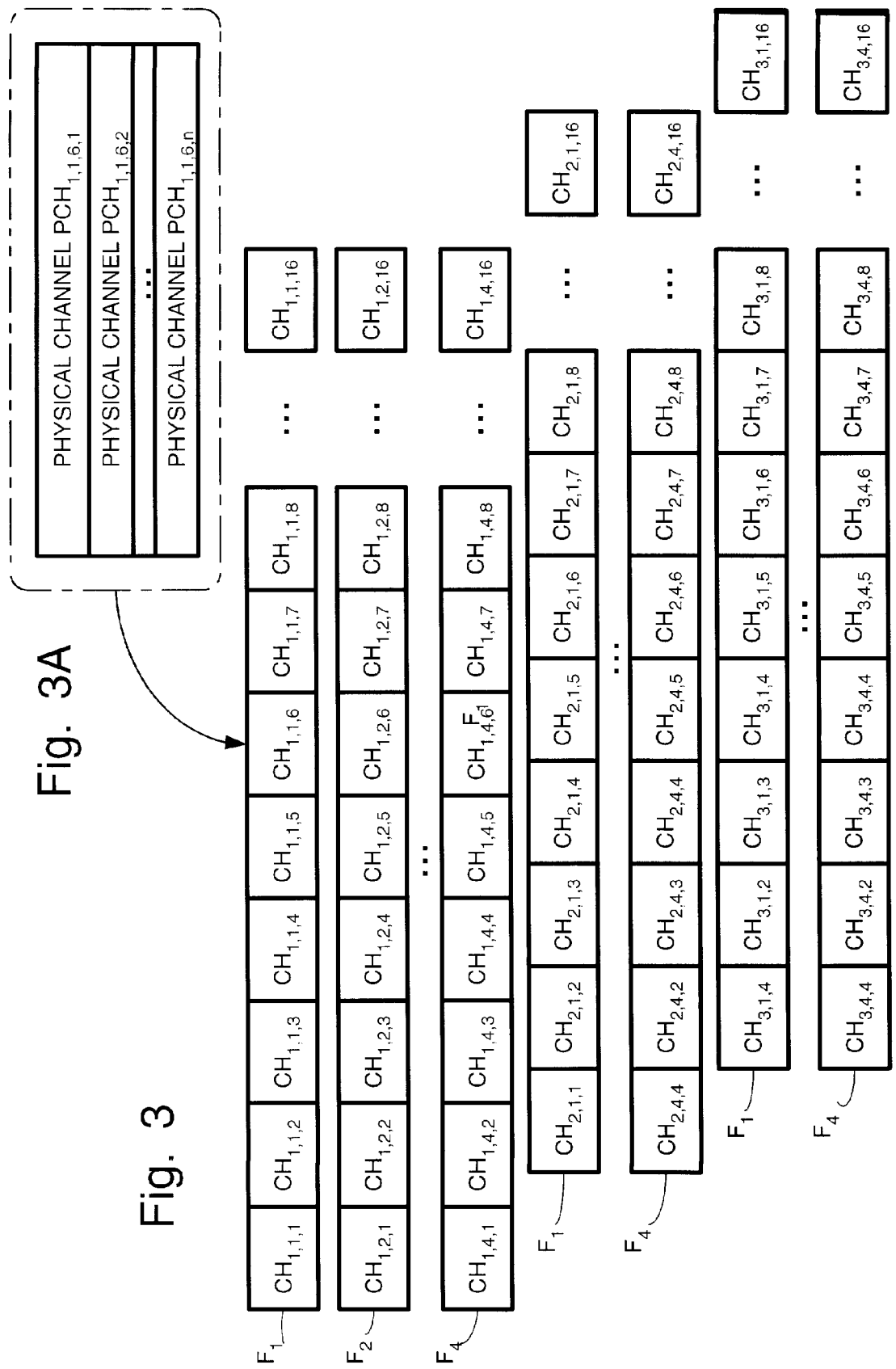

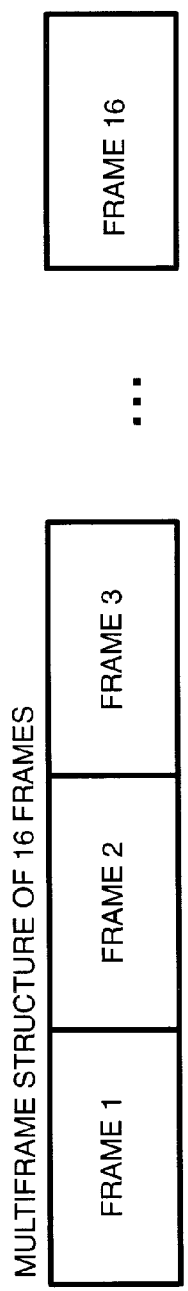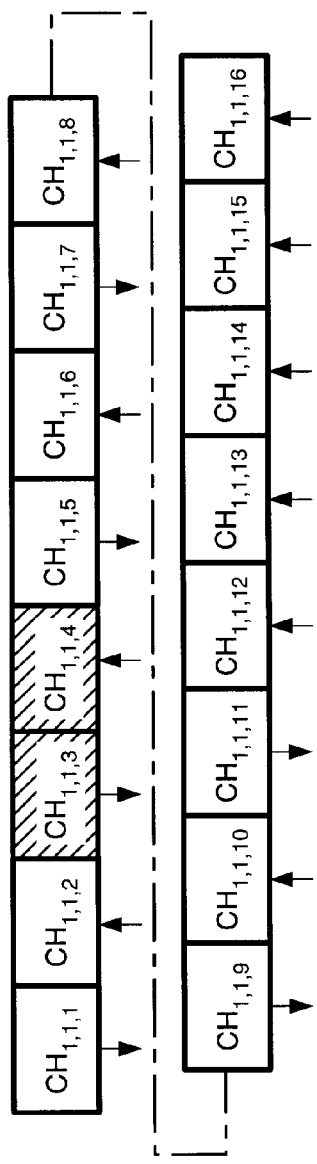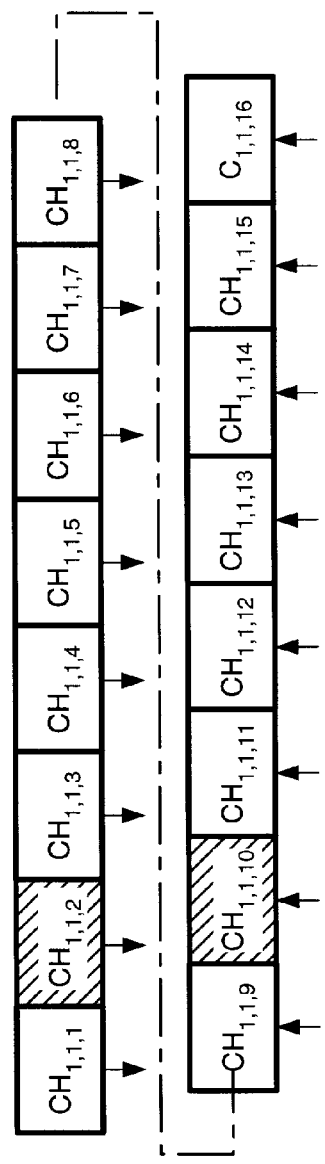
Fig. 6
Fig. 7A
Fig. 7B

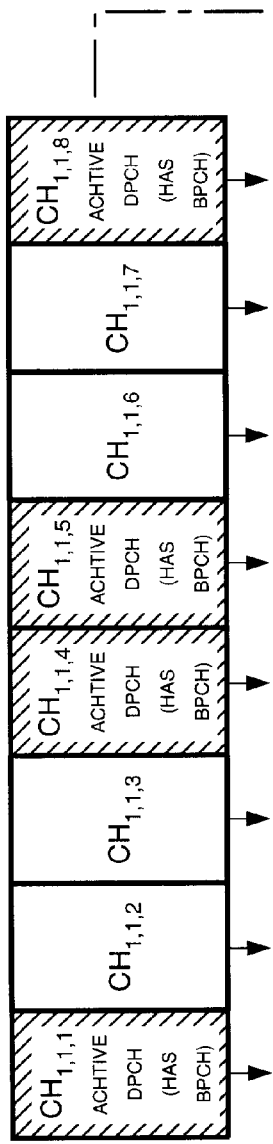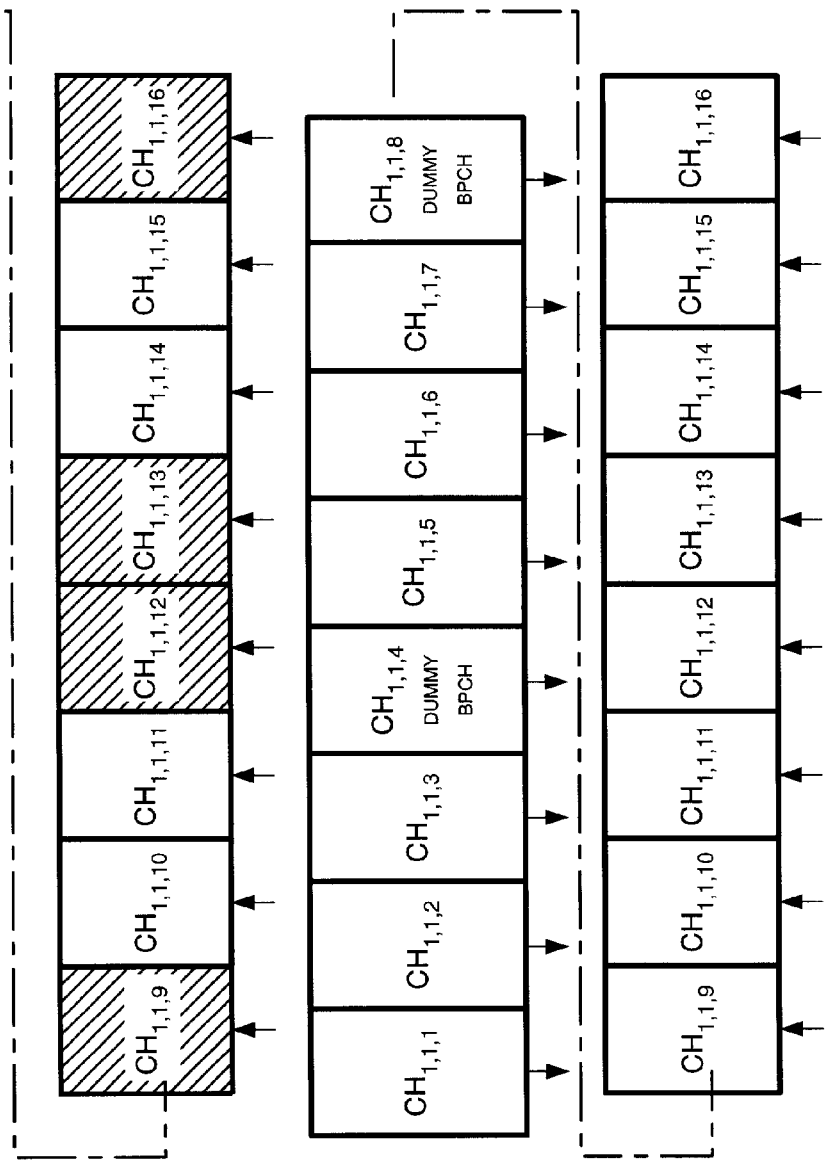
Fig. 8A
Fig. 8B

UTILIZATION OF PLURAL MULTIPLE ACCESS TYPES FOR MOBILE TELECOMMUNICATIONS

BACKGROUND

1. Field of the Invention

The present invention pertains to wireless or mobile telecommunications system which utilize multiple access type technologies, and particularly to a channel selection scheme for a multiple technology access type system, e.g., CDMA/TDMA system.

2. Related Art and Other Considerations

In wireless or mobile telecommunications systems, user equipment in the form of a mobile station (e.g., mobile telephone) is typically in radio communication over an air interface with a base station. There are numerous techniques for providing access to the mobile telecommunications system for multiple users, e.g., multiple mobile stations. One general technique (known as frequency division multiple access [FDMA]) employs plural carrier radio frequencies, and assigns each user a different radio frequency. But since each simultaneous radio frequency transmission requires one radio, other techniques are often utilized to decrease cost and increase the flexibility of offered services (either alone or in conjunction with FDMA). One such other technique is time division multiple access [TDMA], wherein each carrier frequency is conceptualized as carrying frames of information, each frame then being divided into time slots or channels, with differing users having differing time slots. Typically (for duplex) there needs to be an "uplink" time slot or channel for sending traffic from the mobile to the base station and a "downlink" time slot for sending traffic from the base station to the mobile.

One example technology which combines FDMA and TDMA (multi-carrier TDMA [MC/TDMA]) operates in Europe in the spectrum of 1880–1900 MHz under the name DECT. Aspects of DECT are described in ETR 310: August 1996, Annex E: DECT Instant Dynamic Channel Selection (DCS) Procedures, pp. 69–74. DECT installations are primarily intra-company mobile telecommunications systems which typically are quite limited in geographical range. In DECT, mobile stations are always locked to a closest (strongest) base station. After having locked itself to a strongest of the base stations, the mobile station makes a list of least interfered channels which it regularly updates. When the user of the mobile station desires to make a call, the mobile station selects the best channel and sends an access request (RACH) message to the strongest base station. This request is sent in synchronism with the base station receiver RF carrier scanning order. If a response is received on the relevant duplex response slot, the duplex channel is established. In DECT, handover is controlled by the mobile station. An automatic or seamless ("make before break") handover is made as soon as another base station becomes stronger. DECT provides paging and system information on every downlink channel.

Mobile telecommunications service can be provided using yet another multiple access technique known as code division multiple access (CDMA). In a code division multiple access (CDMA) mobile telecommunications system, the information transmitted between a base station and a particular mobile station is modulated by a mathematical code (such as spreading code) to distinguish it from information for other mobile stations which are simultaneously utilizing the same radio frequency. Thus, in CDMA, the individual radio links are discriminated on the basis of codes. In addition, in CDMA mobile communications, typically the same baseband signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels to/from multiple base stations by a mobile station, such as occurs in a CDMA scheme for example, is termed "soft handover" or "macro diversity." In some geographical areas, FDMA/CDMA or MC/CDMA is utilized in the frequency spectrum beginning at 1920 MHz. Various aspects of CDMA are set forth in Garg, Vijay K. et al., *Applications of CDMA in Wireless/Personal Communications*, Prentice Hall (1997).

Traditional Direct Sequence CDMA (DS-CDMA) mobile radio systems require careful coordination of all systems using a common spectrum. DS-CDMA systems require rapid and accurate up-link power control of all mobile stations within a cell. Accordingly, operation of geographically overlapping DS-CDMA system is problematic. Thus, typically DS-CDMA does not have more than one system controlling the transmit power of mobile stations within a given cell and same spectrum.

Subject to the foregoing concerns, if overlapping DS-CDMA systems were configured and discriminated on the basis of spreading codes, the systems likely would not have sufficient capacity. In this regard, while a first DS-CDMA system might be assigned a first subset of the spreading codes and a second DS-CDMA system be assigned a second subset of the spreading codes, it should be kept in mind that generally the number of usable codes is relatively small (on the order of 50–100, for example). Moreover, this constraint is particularly onerous if more than two DS-CDMA systems were to overlap, or if expansion of further DS-CDMA systems is desired in the same geographical region. Traditional DS-CDMA mobile radio systems need careful coordination of all systems using a common spectrum, since different systems (without handover between them) can not operate in the same geographical area. The reason is that the key functionality of DS-CDMA systems is based upon equal down-link power for all connections and quick and accurate up-link power control of all handsets within a cell. Therefore, it is not allowed (on the same frequency) within a cell of a system to have one or more handsets, whose transmit power is not under the control of that system. This is in popular terms called the near/far problem. Therefore, in order to accommodate a large number of mobile stations, e.g., in a large geographical area, system discrimination merely on the basis of spreading codes is inadequate.

Opportunities exist for development of other segments of the frequency spectrum, such as 1900–1920 MHz in Europe, for example. What is particularly desired is to have plural uncoordinated DECT-like systems operating in an overlapping fashion, e.g., in larger than traditional DECT-sized geographical areas. It is contemplated that future technologies might employ a marriage of all three techniques: TDMA, FDMA, and CDMA. One main advantage of DS-CDMA systems, compared to MC/TDMA systems, is that it is possible to make a trade off between range and traffic capacity. Yet is not clear how these three techniques can interwork effectively, particularly since the sharing of spectrum resources between uncoordinated systems installed in a same geographical area is possible only in the frequency and time domains (but not the code domain due, e.g., to the above-mentioned near/far problem).

Traditional direct sequence DS-CDMA mobile radio systems need careful coordination of all systems using a common spectrum, since different systems (without handover between them) can not operate in the same geographical area. The reason is that the key functionality of DS-CDMA systems is based upon equal down-link power for all connections and quick and accurate up-link power control of all handsets within a cell. Therefore, it is not allowed (on the same spectrum) within a cell of a system to have one or more handsets, whose transmit power is not under the control of that system.

Application of various kinds of Instant Dynamic Channel Selection procedures (where the channel selection is made on per-call bases) are known, e.g. for MC/TDMA systems like DECT, which provides for uncoordinated system installations on a common spectrum. IDCS for DS-CDMA does however require specific solutions to address the new problems due to addition of CDMA. One main advantage of DS-CDMA systems, compared to MC/TDMA systems, is that it is possible to make a trade off between range and traffic capacity.

What is needed, therefore, and an object of the present invention, is a channel selection scheme for uncoordinated systems in a same geographical area which utilize multiple technology access types.

One of the many advantages of the present invention is that it also applies to CDMA systems with processing gain that is so low that the typical reuse factor 1 cannot be used. For this case the cumbersome channel planning needed for the different cells is made automatic.

BRIEF SUMMARY OF THE INVENTION

A first telecommunications system has at least partially geographically overlapping coverage with a second telecommunications system, with radio transmission access in the first telecommunications system utilizing code division multiple access (CDMA) with a time division multiple access (TDMA) component. A base station of the first telecommunications system communicates over an air interface with a subscriber station and broadcasts a common broadcast physical channel on at least an active carrier/timeslot combination. The common broadcast physical channel includes broadcast system identity information. The subscriber station uses the broadcast system identity information to distinguish between transmissions of the first telecommunications system and the second telecommunications system. Moreover, the subscriber station uses the broadcast system identity information for framing transmissions in the first telecommunications system.

The base station of the first system broadcasts at least two common broadcast physical channels active on different timeslots. Preferably, a fixed direct sequence CDMA code is employed for the common broadcast physical channel.

In accordance with an instant dynamic channel selection procedure of the present invention, the subscriber station selects a carrier/timeslot for sending an access request to the first system base station. The carrier/timeslot selected by the first system subscriber station for sending an access request to the first system base station is also used for a traffic channel. Preferably, the first system subscriber station selects a least interfered carrier/timeslot as the carrier/timeslot for sending an access request to the first system base station. In response to the access request, the first system base station sends an answer on a next down-link carrier/timeslot included in a duplex pair with the carrier/time slot which the first system subscriber station selected for sending the access request to the first system base station.

At an given moment a connection between the first system base station and the subscriber station is borne on a physical channel of the first telecommunications system, the physical channel being defined by a code, timeslot, and frequency.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view illustrating plural mobile telecommunications systems operating in accordance with an embodiment of the present invention, the plural mobile telecommunications systems operating on plural carriers, each plural carrier having plural carrier/timeslot channels.

FIG. 3A is a diagrammatic view of carrier/timeslot channel for illustrating a DS-CDMA component.

FIG. 4 is a diagrammatic view illustrating channels utilized in accordance with the present invention.

FIG. 6 is a diagrammatic view of an example multi-frame format of a common broadcast physical channel (BPCH) utilized in accordance with the present invention.

FIG. 7A and FIG. 7B are diagrammatic views respectively illustrating a multiple switching point configuration for a duplexed carrier and a single switching point configuration for a duplexed carrier.

FIG. 8A and FIG. 8B are diagrammatic views respectively illustrating (A) employment of active downlink dedicated physical channels (DPCH) for carrying the common broadcast physical channel (BPCH); and (B) creation of dummy common broadcast physical channels (BPCH) when there are no active downlink dedicated physical channels (DPCH).

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
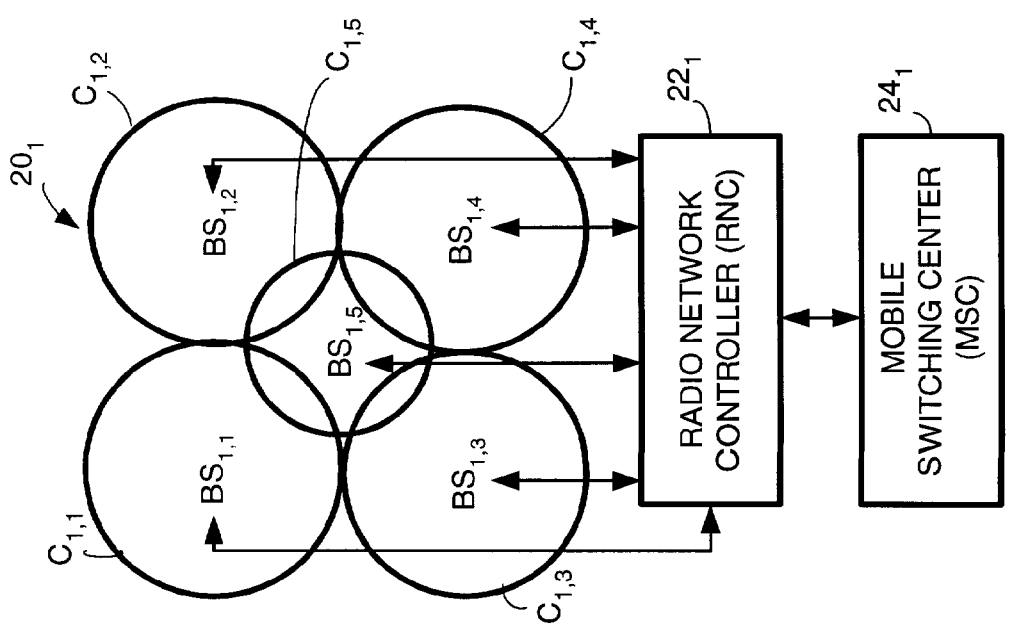
FIG. 1 is a schematic view of a mobile telecommunications system.

FIG. 1 shows a mobile telecommunications system $20_1$ which comprises plural base stations $BS_{1,1}$ through $BS_{1,5}$ serving respective cells $C_{1,1}$ through $C_{1,5}$. Each base station BS has one or more antennae which communicate over an air interface, e.g., over radio channels, with one or more subscriber stations located in the respective cells C. Accordingly, each base station BS has at least one radio frequency transmitter and at least one radio frequency receiver.

The base stations $BS_{1,1}$ through $BS_{1,5}$ of mobile telecommunications system $20_1$ are connected by landlines or, e.g., microwave links to a radio network controller (RNC) $22_1$, also known as a base station controller. The radio network controller (RNC) $22_1$ performs various functions known to those skilled in the art, including (for example) handover operations as required when a mobile subscriber station moves from one cell to another. While the example mobile telecommunications system $20_1$ of FIG. 1 is illustrated with five cells C all controlled by radio network controller (RNC) $22_1$, it will become apparent that a mobile telecommunications system of the present invention can be operated with fewer or more cells. Further, one or more radio network controllers (RNCs) may be included in a mobile telecommunications system of the present invention, with there being no particular constraint on the number of base stations controlled by any radio network controller (RNC), nor is it necessary that all radio network controllers (RNCs) control the same number of base stations.

The radio network controller (RNC) $22_1$ is connected by e.g., terrestrial lines to a mobile switching center (MSC) $24_1$. Through the mobile switching center (MSC) 24 the mobile telecommunications system $20_1$ connects to other mobile telecommunications systems and to fixed or wire telecommunications systems. Examples describing the structure and operation of the base station, radio network controller (RNC), and mobile switching center (MSC) nodes of a mobile telecommunications system generally are provided in the following United States patent applications, all of which are incorporated herein by reference: U.S. patent application Ser. No. 09/188,102 for "Asynchronous Transfer Mode System"; U.S. patent application Ser. No. 09/035,821 for "Telecommunications Inter-Exchange Measurement Transfer"; U.S. patent application Ser. No. 09/035,788 for "Telecommunications Inter-Exchange Congestion Control"; and U.S. patent application Ser. No. 09/071,886 for "Inter-Exchange Paging".

Figure 2:
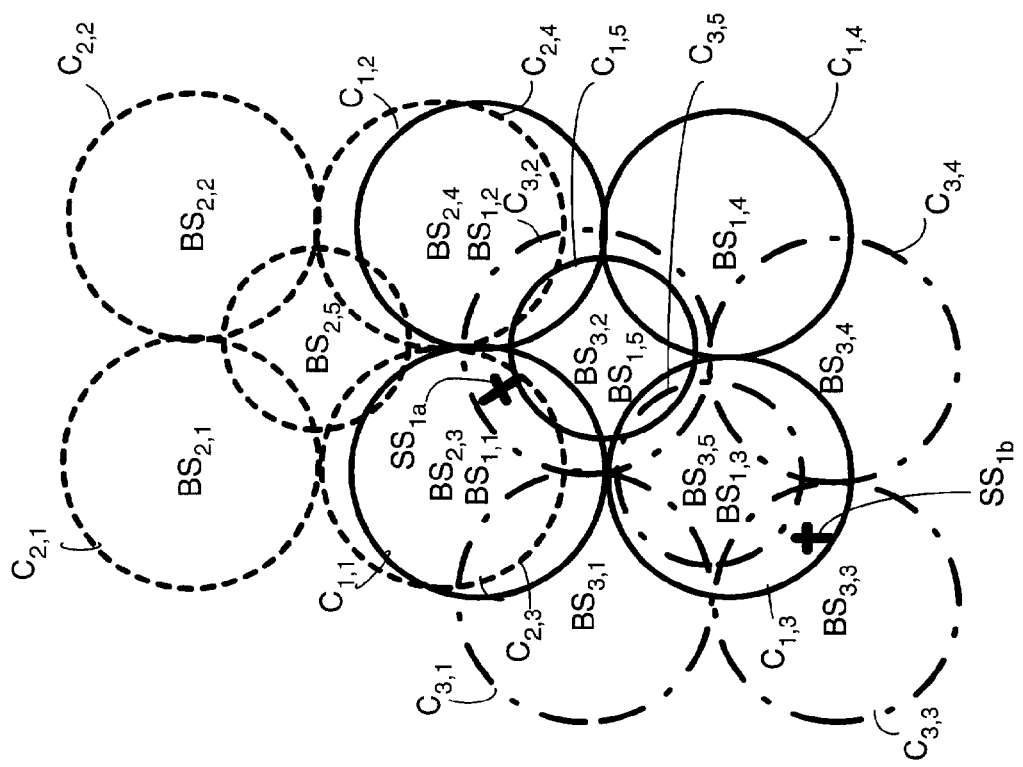
FIG. 2 is a schematic view of plural mobile telecommunications systems having at least partially overlapping geographical coverage.

The present invention particularly concerns a situation in which plural mobile telecommunications systems are operating in uncoordinated manner in geographical areas which are at least partially overlapping. In this regard, FIG. 2 shows the base stations $BS_{1,1}$ through $BS_{1,5}$ and respective cells $C_{1,1}$ through $C_{1,5}$ (illustrated in solid lines) of mobile telecommunications system $20_1$ along with base stations and cells of mobile telecommunications system $20_2$ and mobile telecommunications system $20_3$. The mobile telecommunications system $20_2$ comprises base stations $BS_{2,1}$ through $BS_{2,5}$ and respective cells $C_{2,1}$ through $C_{2,5}$ (illustrated in dotted lines in FIG. 2); mobile telecommunications system $20_3$ comprises base stations $BS_{3,1}$ through $BS3,5$ and respective cells $C_{3,1}$ through $C_{3,5}$ (illustrated in dotted-dashed lines in FIG. 2). Thus, it can be ascertained from the subscript scheme that the first element of a subscript for a base station or cell identifies its mobile telecommunications system, while the second subscript for a base station or cell identifies the particular base station or cell within that system.

To at least some extent there are regions of geographical overlap in the coverage areas served by the respective mobile telecommunications systems $20_1$, $20_2$, and $20_3$. For example, subscriber stations $SS_{1a}$ and $SS_{1b}$ belong to mobile telecommunications system $20_1$ and are situated as shown in FIG. 2. Subscriber station $SS_{1a}$ is within geographical range of all three mobile telecommunications systems. In this regard, it can be seen in FIG. 2 that subscriber station $SS_{1a}$ is situated in cell $C_{1,1}$ of mobile telecommunications system $20_1$; in cell $C_{2,3}$ of mobile telecommunications system $20_2$; and in cell $C_{3,2}$ of mobile telecommunications system $20_3$. Subscriber station $SS_{1b}$ is at the range limit of base station $BS_{1,3}$ and operates at maximum power, which would block $BS_{3,3}$ if used simultaneously on the same carrier. The present invention provides a way for subscriber station $SS_{1a}$ to discriminate between the transmissions of the three mobile telecommunications systems to which it is subjected, for ascertaining what transmissions are intended for subscriber station $SS_{1a}$, and for dynamically selecting channels for use in radio communications involving subscriber station $SS_{1a}$. Hereinafter, for sake of simplicity, all reference to subscriber station SS should be understood to be the example subscriber station $SS_{1a}$.

As mentioned above, the invention also addresses the problem for a single system when channel reuse 1 is not possible between the cells of the system. For this case proper carrier/time-slot channels (see below) are automatically selected so that the connections in adjacent cells do not interfere with each other. Modern CDMA systems have the capability to trade processing gain against instant user bit rate. Thus at some limit when increasing the used bit rate, reuse 1 is no longer possible, which would result in a sudden cumbersome "manual" channel planning for the different cells. The invention also avoids this need for planning.

Each of the mobile telecommunications systems shown in FIG. 2 have multiple radio frequency carriers and utilize code division multiple access (CDMA) with a time division multiple access (TDMA) component, as illustrated in FIG. 3. For example, each mobile telecommunications system uses the same four radio frequency carriers $F_1$–$F_4$. Each radio frequency carrier F is divided into plural timeslots. In the particular example shown in FIG. 3, each radio frequency carrier F is divided into sixteen (16) timeslots. Each combination of carrier and timeslot is herein referred to as a carrier/timeslot channel and is abbreviated both as "C/TS" and "CH". For example, the mobile telecommunications system $20_1$ has carrier/timeslot channels $CH_{1,1,1}$ through $CH_{1,1,6}$ for radio frequency carrier $F_1$, while for radio frequency carrier $F_2$ the mobile telecommunications system $20_1$ has carrier/timeslot channels $CH_{1,2,1}$ through $CH_{1,2,16}$. Similarly, for a given radio frequency carrier $F_x$ the mobile telecommunications system $20_2$ has carrier/timeslot channels $CH_{2,x,1}$ through $CH_{2,x,16}$, while mobile telecommunications system $20_3$ has carrier/timeslot channels $CH_{3,x,1}$ through $CH_{3,x,16}$. Thus, it can be seen that in the subscript notation for a carrier/timeslot channel the first element refers to the number of the mobile telecommunications system (e.g. mobile telecommunications system $20_1$, $20_2$, or $20_3$); the second element refers to the radio frequency carrier (e.g., $F_1$, $F_2$, $F_3$, or $F_4$); and the third element refers to the timeslot (e.g., one of the timeslots 1 through 16).

Examples of duplex carrier/timeslot channels are provided in FIG. 7A and FIG. 7B. As used herein, the term "duplex" means a pairing of an uplink carrier/timeslot channel and a downlink carrier/timeslot channel, within the same frame and on the same carrier. The frames of FIG. 7A and FIG. 7B each are of 10 milliseconds in time duration, and each have sixteen slots (each slot being 625 microseconds). FIG. 7A shows a multiple switching point configuration wherein a downlink carrier/timeslot channel is immediately followed by its paired uplink carrier/timeslot channel. As an example, the shaded downlink carrier/timeslot channel $CH_{1,1,3}$ is immediately followed by the shaded uplink carrier/timeslot channel $CH_{1,1,4}$ which is paired with downlink carrier/timeslot channel $CH_{1,1,3}$. FIG. 7B, on the other hand, shows a single switching point configuration for a duplex wherein the first eight carrier/timeslot channels are for the downlink and the last eight carrier/timeslot channels of the frame are for the uplink. In FIG. 7B, for example, the shaded downlink carrier/timeslot channel $CH_{1,1,2}$ is paired with the shaded uplink carrier/timeslot channel $CH_{1,1,10}$.

Returning to FIG. 3, the FDMA access component of the present invention thus is attributable to the employment of multiple radio frequencies. The TDMA access component is attributable to the timeslotting of each radio frequency carrier. The CDMA access component of the present invention is attributable to the fact that each carrier/timeslot channel accommodates plural physical channels PCH. As used herein, a physical channel PCH is an association of one code, one timeslot, and one frequency. The physical channels (PCH) of each carrier/timeslot channel (C/TS) are discriminated on the basis of direct sequence (DS) CDMA spreading codes. Such is illustrated in FIG. 3A, which shows a representative one of the carrier/timeslot channels $CH_{1,1,6}$ has having physical channels $PCH_{1,1,6,1}$ through $PCH_{1,1,6,n}$. The first three elements of the subscript of a physical channel PCH thus corresponds to the first three elements of the subscript of its carrier/timeslot channel. The fourth element of the subscript of a physical channel PCH refers identifies a particular DS-CDMA spreading code utilizable for a telecommunications connection (e.g., for a call). Thus, on each carrier/timeslot channel, there can be up to n number of physical channels PCH, each separated by a DS-CMDA code. The transmission direction for all physical channels PCH on the same carrier/timeslot channel on the same carrier is the same. A base station equipped with one radio transceiver is only able to operate on one time slot on one carrier at the same time. For sake of simplicity the physical channels PCH of the other carrier/timeslot channels are not shown in FIG. 3, but it should be appreciated that each carrier/timeslot channel CH has multiple physical channels PCH in the same manner as shown in FIG. 3B for carrier/timeslot channel $CH_{1,1,6}$.

The subscriber station SS, whether idle or in communication, is always locked to a closest (strongest) base station of its own system, as in usual DC-CDMA practice. Automatic handover is made as soon as another base station of the same system becomes stronger. Being locked to the strongest base station is important for efficient access channel reuse and link robustness, which leads to high capacity. The handover should be "seamless", which means "make before break", as is important for high quality of service.

Figure 5:
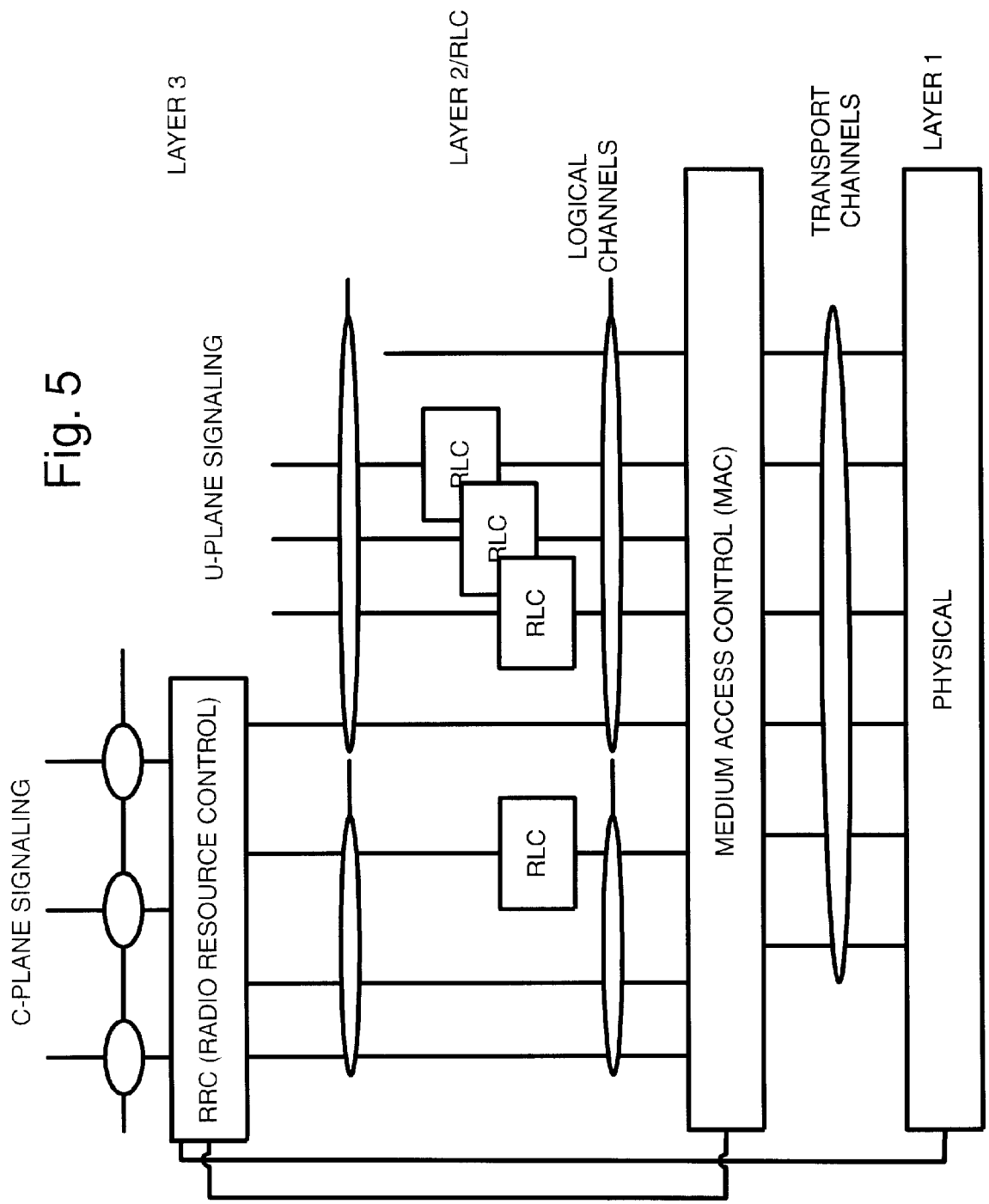
FIG. 5 is a schematic view of a general scheme of radio interface architecture having three protocol layers.

FIG. 5 shows a general scheme of radio interface architecture having three protocol layers: L1 (Physical Layer); L2 (Data Link Layer); and L3 (Network Layer). The Data Link Layer (L2) includes Radio Link Control (RLC) and Medium Access Control (MAC). The Network Layer (L3) is divided into a control plane (C-plane) and user plane (U-plane). Layer 1 is very different for TDD and FDD, for which reason the present invention makes Layer 2 and Layer 3 the same for TDD and FDD as much as possible. Physical layer (PHL) services to the Medium Access Control (MAC) are identified in terms of transport channels. Some of the transport channels are common channels which are used by plural mobile subscriber stations, and include a random access channel (RACH); a forward access channel (FACH); a broadcast channel (BCH); and a paging channel (PaCH). Others of the transport channels are dedicated channels (DCH), e.g., channels which are dedicated to a particular connection for user data and control information between a base station and a mobile subscriber station.

The present invention employs four types of physical channels—the common broadcast physical channel (BPCH); the dedicated physical channel (DPCH); the random access physical channel (RAPCH); and the forward access physical channel (FAPCH). FIG. 4 indicates, for each physical channel type: (1) the one or more transport channels included in the physical channel, (2) the direction (e.g., downlink, uplink) of the physical channel, and (3) the type of spreading employed on the physical channel.

As shown in FIG. 4, the dedicated physical channel (DPCH) includes the dedicated transport channel (DCH) and occurs both on the uplink and the downlink. Both fixed and variable spreading are allowed on the dedicated physical channel (DPCH).

The random access physical channel (RAPCH) is used when a subscriber station desires to obtain a radio access, e.g., to make a telecommunications connection such as to make a call. The random access physical channel (RAPCH) is thus in the uplink direction, and includes the RACH transport channel. In the illustrated embodiment, the random access physical channel (RAPCH) has fixed spreading codes. As explained further below, in the present invention the random access physical channel (RAPCH) is available on every potential uplink carrier/timeslot channel. Moreover, the subscriber station SS dynamically selects the carrier/timeslot channel to use for the random access physical channel (RAPCH), and after acceptance by the base station that same carrier/timeslot channel is employed as the dedicated physical channel (DPCH) for the connection.

The forward access physical channel (FAPCH) is a downlink direction channel used, for example, by a base station in responding to a random access request or a request for packet communications. The forward access physical channel (FAPCH) thus includes the forward access transport channel (FACH). In the illustrated embodiment, the forward access physical channel (FAPCH) has fixed spreading codes.

As also shown in FIG. 4, the common broadcast physical channel (BPCH) includes the broadcast (BCH) and paging (PaCH) common transport channels. Thus, the common broadcast physical channel (BPCH) carries broadcast system identities and capabilities, as well as downlink synchronization information to the subscriber station and in addition the downlink paging channel (PaCH) to the subscriber station. In the illustrated embodiment, the common broadcast physical channel (BPCH) has fixed spreading codes.

Figure 4A:
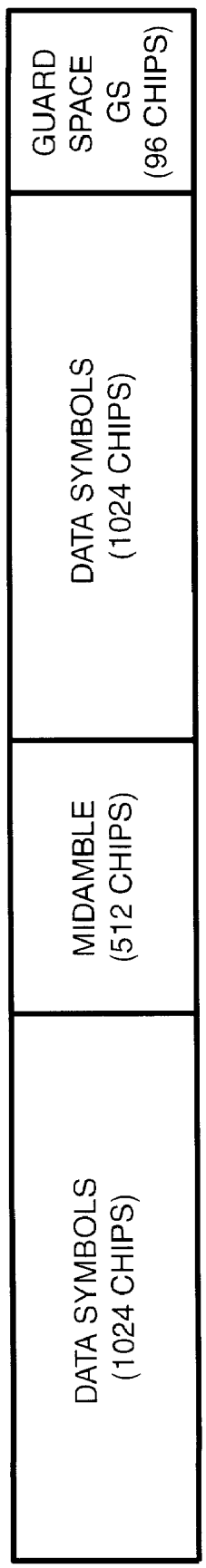
FIG. 4A is a diagrammatic view of an example of bit structure for physical channels BPCH, DPCH, RAPCH, and FAPCH.

FIG. 4A shows an example of how to structure the physical channels common broadcast physical channel (BPCH), random access physical channel (RAPCH), forward access physical channel (FAPCH), and dedicated physical channel (DPCH). A time slot comprises a midamble of 512 chips and 1024 data chips on each side. There is also a guard space GS of 96 chips before the next slot begins. The midamble is used to derive slot and bit synchronization, not necessarily any system identification. A preamble at the beginning of the slot could, of course, have been used instead of a midamble. The midamble could be common for all systems, but does not necessarily need to be so. In other embodiments, the midamble could be geographically specific for each base station in a system, or be specific for each simultaneous PCH on a C/TS. This last version could be useful if a specific decoding technique called joint detection is implemeted. Thus, the specific spreading codes of FIG. 4 that differentiate the different physical channels (PCH) apply only to the remaining 1024+1024=2048 chips, which thus will carry the information content of the physical channels. With a variable spreading factor (SF) from 1 to 32, there are between 64 and 2048 bits available on each physical channel to carry information. Supposing the frame rate to be 100 Hz (10 ms frame length), the raw bit rate will be 6.4 kbps with SF=32 and 204.8 kbps with SF=1. If there are 16 timeslots, the total chip rate will be 16×(512+2048+96)×100=4,249, 600 chips/sec. This could be implemented on 5 MHz wide frequency carriers depending on type of modulation.

In a preferred embodiment, SF=16 for RAPCH, FAPCH and DPCH. This will provide 12.8 kbps (128 bits per slot). This is suitable for a DPCH speech service and also for quick RACH and FACH transfer. How to compose a RACH or FACH message is common knowledge and does not need further description here. An example is provided for the mapping of the BCH and PaCH information on BPCH.

Figure 4B:
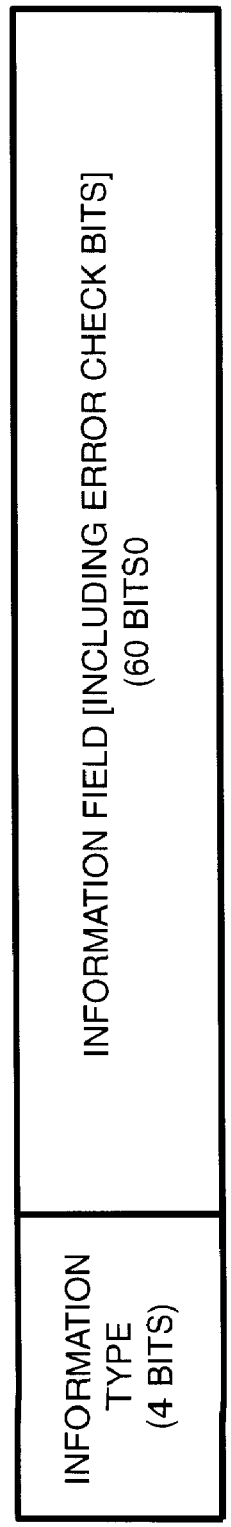
FIG. 4B is a diagrammatic view showing the mapping of information type on 64 data bits of each BPCH frame.

In a preferred embodiment, SF=32 or higher for BPCH, because it is very important that the BPCH information be received by all idle subscriber stations SS. FS=32 will provide 6.4 kbps or 64 bits per slot. All BPCH information cannot fit in one slot, but that is not needed. Therefore, a multi-frame has been defined in FIG. 6 comprising 16 frames, each frame comprising 16 carrier/timeslot channels (see FIG. 7B) $CH_{x,x,1}$ to $CH_{x,x,16}$. In FIG. 6, the 16 carrier/timeslot channels are shown only for the first frame, it being understood that all 16 frames also have 16 carrier/timeslot channels. It is possible to fit all the different types of BPCH information in different frames in two or more multiframes. To do this and to be able to receive the relevant type of BPCH information, even if it is not known exactly in which frame it comes, the 64 data bits in one frame are divided into 4 bits to describe the information type and the remaining 60 bits for coding the wanted information (as shown in FIG. 4B).

The type of information required in BCH and PaCH for mobile systems is common knowledge, but Table 1 gives examples of required information types and how they could be identified and mapped on different frames in a multi-frame. The different information types in Table 1 are mapped on the multi-frame with different priorities. Paging has the highest priority and can be sent on all odd frames. A subscriber station in an idle locked current saving mode only has to listen to frame 1. All paging frames will have a bit that tells if the next odd frame within a multi-frame has any paging content or not. Thus, Frame 1 will inform if paging information is present in any subsequent odd frame in the present multi-frame. If there is no paging information to be sent in an odd frame, the subscriber station can go back to sleep until frame occurs again.

TABLE 1

Examples of Identification and Mapping of Information Types On Different Frames In A Multiframe

| Information Type | | Content in information field (60 bits | To be transmitted |
|---|---|---|---|
| Type of information | Code (4 bits) | including error detection bits) | in frame number |
| PaCH, Paging | 0000 | Global or temporary mobile user identity | 1, 3, 5, 7, 9, 11, 1, 3, 15 |
| BCH part 1 System identity | 0001 | System identity and transmitting base station identity | 2 |
| BCH part 2 Synchronization | 0010 | Slot number in the frame and frame number in the multi-frame for the received slot (Note that chip, bit and slot synchronization is provided via the midamble) | 4 |
| BCH part 3 System capabilities | 0011 | Coded information on system capabilities | 6 |
| Reserved for other types of information | 0100-1111 | Any other type of information | 8, 10, 12, 14, 16 |

Some CDMA systems define a specific synchronization channel, which could or could not include some system identify information. Such is not required in this invention, because the chip, bit, and slot synchronization is provided in the common structure with the midamble of the common broadcast physical channel (BPCH) (and all other PCHs) [see FIG. 4A], and remaining synchronization and system identity information is provided by the BCH (see Table 1).

The common broadcast physical channel (BPCH) is distributed on each active downlink carrier/timeslot channel CH, e.g., those carrier/timeslot channels with an active dedicated physical channel (DPCH). FIG. 8A shows a single switching point configuration for a duplex channel for radio frequency carrier $F_1$ in mobile telecommunications system $20_1$ wherein each of carrier/timeslot channels $CH_{1,1,1}$, $CH_{1,1,4}$, $CH_{1,1,5}$, and $CH_{1,1,8}$ have active traffic (as indicated by shading). Therefore each of carrier/timeslot channels $CH_{1,1,1}$, $CH_{1,1,4}$, $CH_{1,1,5}$, and $C_{1,1,8}$ carries the common broadcast physical channel (BPCH).

If there are less than two active downlink dedicated physical channels (DPCH), the base station creates one or two dummy common broadcast physical channels (BPCH) on different carrier/timeslot channels as needed. A BPCH is called a dummy BPCH when the base station has no other physical channel on the specific carrier/timeslot channel used by the BPCH. In the situation shown in FIG. 8B, there are no active downlink dedicated physical channels (DPCH) emanating from a base station, which means that the base station has to create two dummy common broadcast physical channels (BPCH) on different carrier/timeslot channels such as $CH_{1,1,4}$ and $CH_{1,1,8}$. The two dummy common broadcast physical channels (BPCH) such as $CH_{1,1,4}$ and $CH_{1,1,8}$ thus each carry the common broadcast physical channel (BPCH). If there were only one active downlink dedicated physical channel (DPCH) emanating from a base station, that base station would have to create one dummy common broadcast physical channel (BPCH). A subscriber station equipped with one radio transceiver is only able to operate on one time slot on one carrier at the same time (but could in a multi-carrier case operate on different carriers on different time slots). By always having BPCH active on at least two different time slots, a subscriber station may be in communication on one time slot, and still be able to detect surrounding cells of the same system and make a quick handover to them as soon as they become stronger than the own base station (due to the mobility of the subscriber station).

Figure 12:
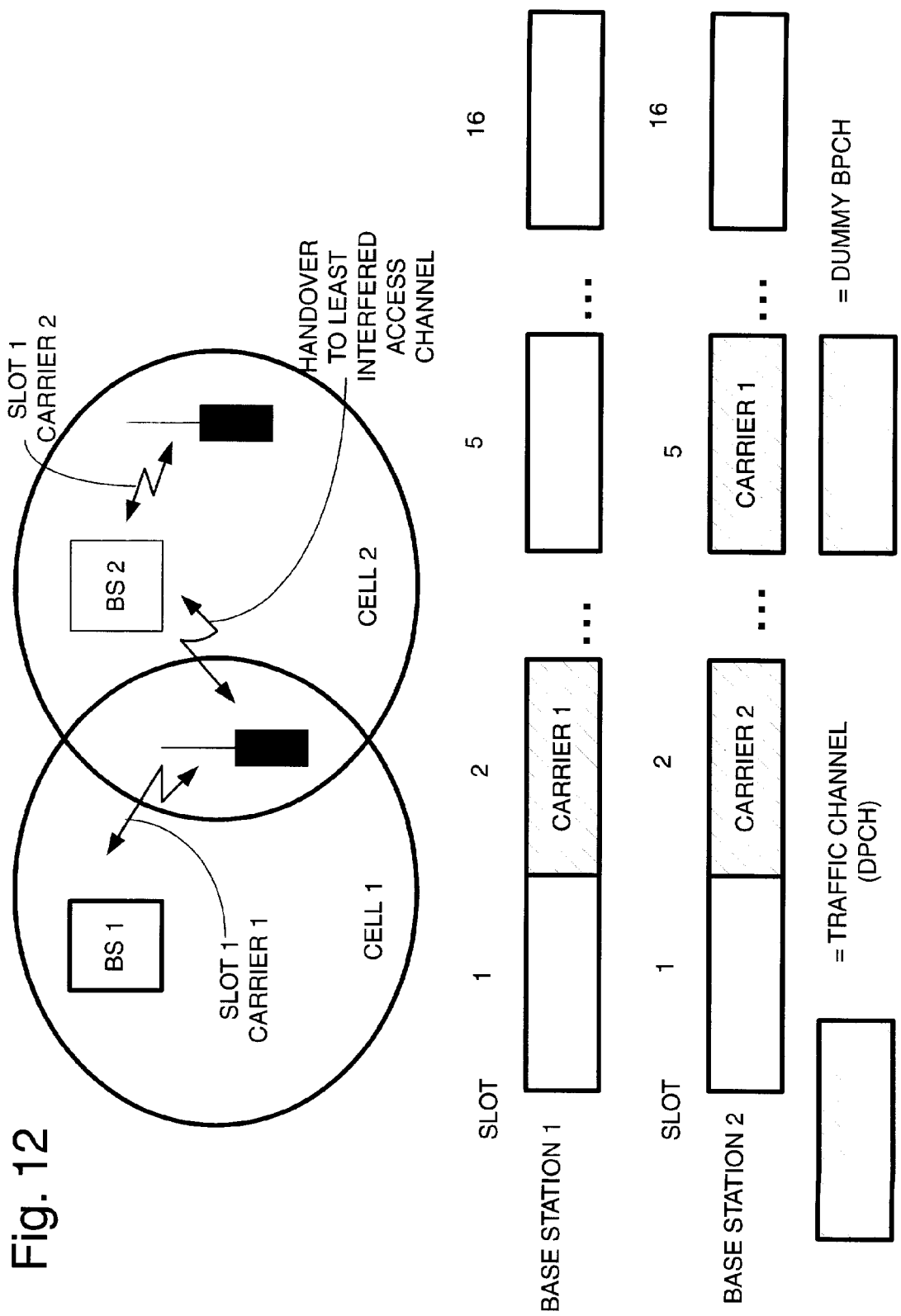
FIG. 12 is a schematic view showing an example of how blind spots are avoided when making a seamless handover.

The dummy common broadcast physical channels (BPCH) are set up and kept on a least interfered carrier/timeslot channel by the base station. In order to do so, the base station periodically (e.g., every second) checks the interfering power for each carrier/timeslot channel and moves the dummy common broadcast physical channel (BPCH) if required to the new best carrier/timeslot channels. In so doing, a short pause may be made during a frame when idle locked handsets are sleeping. Since the common broadcast physical channel (BPCH) is activated on every downlink carrier/timeslot channel with traffic (e.g, DPCH), the dummy common broadcast physical channels (BPCH) are released when two carrier/timeslot channels are carrying traffic. When needed, the dummy common broadcast physical channels (BPCH) are activated again, so that always at least two downlink carrier/timeslot channels on the same carrier have dummy common broadcast physical channels (BPCH). The base station may select the differing timeslots to have at least one slot separation therebetween in order, e.g., to avoid blind slots at seamless handover. FIG. 12 provides an example of how blind slots are avoided when making a seamless handover from cell 1 to cell 2. If there had been no traffic in cell 2, then the traffic bearer on carrier 2 would have been a second dummy BPCH.

Thus, in accordance with the present invention, at least two of the carrier/timeslot channels from each base station have the common broadcast physical channel (BPCH). All carrier/timeslot channels which have active downlink dedicated physical channels (DPCH) also carry the common broadcast physical channel (BPCH) as in the manner illustrated in FIG. 8A.

Figure 9:
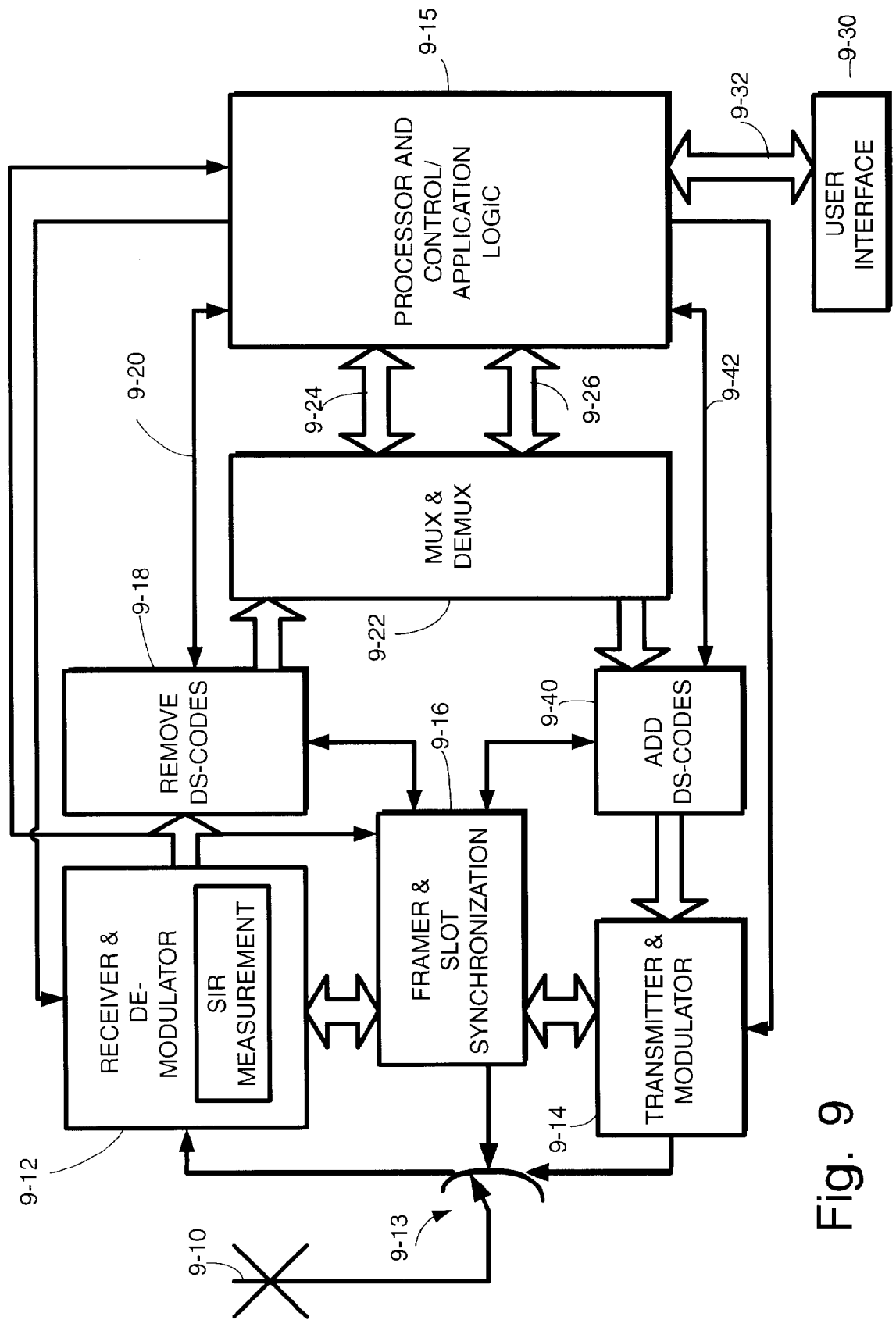
FIG. 9 is a schematic view of a subscriber station according to an embodiment of the present invention.

FIG. 9 shows components of an example subscriber station SS. The subscriber station SS described herein can be any type of mobile telecommunications unit, including (for example) a mobile telephone or portable computer. The subscriber station SS has its antenna 9-10 suitably connected to receiver & demodulator 9-12 and to transmitter & modulator 9-14 by switch 9-13. Overall operational control of subscriber station SS, and the application logic for subscriber station SS, resides at processor and control/application logic 9-15. Hereafter, for simplicity, processor and control/application logic 9-15 is referred to simply as processor 9-15.

On a receive side of subscriber station SS, information demodulated by receiver & demodulator 9-12 is applied to framer and slot synchronization unit 9-16 and DS-code removal unit 9-18. Both receiver & demodulator 9-12 and framer and slot synchronization unit 9-16 are controlled by processor 9-15, as shown by control lines emanating from processor 9-15. The subscriber station SS operates using one or more spreading codes, including a predetermined or native direct sequence (DS) spreading code and (in the illustrated embodiment) a fixed spreading code which is employed for certain physical channels as described above with reference to FIG. 4. The spreading codes employed by subscriber station SS are stored at processor 9-15. The processor 9-15 provides DS-code removal unit 9-18 with the parameters of the spreading codes over line 9-20. Using the code parameters supplied by processor 9-15, the DS-code removal unit 9-18 determines whether the incoming transmission has the same spreading code as is native to subscriber station SS or the fixed spreading code used for common physical channels of the mobile telecommunications system $20_1$ to which the subscriber station SS belongs. If the DS-code removal unit 9-18 detects the native or fixed spreading code, it decodes the incoming transmission. The decoded data obtained from the incoming transmission is applied to a multiplexer and demultiplexer unit (mux & demux 9-22). Data is bidirectionally communicated between mux & demux 9-22 and processor 9-15 on data bus 9-24; control information is bidirectionally communicated between mux & demux 9-22 and processor 9-15 on control bus 9-26.

The control and applications logic included in processor 9-15 of subscriber station SS can be of various types. Examples of the content of a typical mobile control and application logic executed by processor 9-15 are provided in the further description below. Moreover, the processor 9-15 communicates with a user interface 9-30 over interface bus 9-32. For a typical mobile telephone, for example, the user interface 9-30 can include the telephone keypad.

On its transmit side, data gated from processor 9-15 through mux & demux 9-22 is applied to DS-code add unit 9-40. The DS-code add unit 9-40 encodes the data using the native or fixed DS code parameters received from processor 9-15 over line 9-42. The encoded data is then modulated by transmitter & modulator 9-14, and put in the correct frame ad carrier/timeslot channel by framer and slot synchronization unit 9-16. The framed information is then transmitted to antenna 9-10 via transmitter & modulator 9-14. The transmitter & modulator 9-14 is connected to processor 9-15 for, e.g., control purposes. The switch 9-13 is controlled from framer and slot synchronization unit 9-16 and connects the antenna 9-10 to the transmitter 9-14 during transmit slots and to the receiver 9-12 during receive slots.

With the physical channels and subscriber station SS having been described, it can now be appreciated (e.g., with reference to the general steps of FIG. 10) how the subscriber station SS situated as shown in FIG. 2 communicates with its mobile telecommunications system $20_1$ (amidst the extraneous transmissions of mobile telecommunications system $20_2$ and mobile telecommunications system $20_3$). For example, if it is assumed subscriber station SS is powered on as shown in step 10-1 of FIG. 10. After start up, the receiver & demodulator 9-12 of subscriber station SS monitors its native frequency (or frequencies), i.e., a predetermined one or more of the radio frequency carriers $F_1$–$F_4$, as shown by Step 10-1. Step 10-2 shows that the information received on the native frequency is decoded by DS-code removal unit 9-18, which attempts to detect a spreading code used for the common broadcast physical channel (BPCH) of mobile telecommunications system $20_1$. In the illustrated embodiment, the spreading code employed for common broadcast physical channel (BPCH) is a fixed spreading code, which means that the spreading code for common broadcast physical channel (BPCH) is used by all (or at least plural) subscriber stations for detecting common broadcast physical channel (BPCH). When the DS-code removal unit 9-18 detects the spreading code employed for the common broadcast physical channel (BPCH) of its mobile telecommunications system $20_1$, the mux & demux 9-22 sends the BPCH information to processor 9-15 which examines the information content of the common broadcast physical channel (BPCH) at step 10-3. In particular, at step 10-3 the system identifier (see system identity in Table 1) included in the common broadcast physical channel (BPCH) is examined. Then, at step 10-4 processor 9-15 checks whether the system identifier carried in the common broadcast physical channel (BPCH) is the same as the system identifier pre-stored in the application logic of processor 9-15 of subscriber station SS. In this regard, it should be kept in mind that other mobile telecommunications systems could use the same spreading code for their common broadcast physical channel (BPCH), so the checks of step 10-3 and step 10-4 are necessary.

In an alternative embodiment, the DS-code removal unit 9-18 is loaded from processor 9-15 with the system identifier, and the steps 10-3 and 10-4 are hardware coded in DS-code removal unit 9-18. This is useful if the processor 9-15 is not fast enough to quickly perform the system identification.

If it is determined at the decoded common broadcast physical channel (BPCH) is, in fact, for the mobile telecommunications system $20_1$ to which subscriber station SS subscribes, at step 10-5 the subscriber station SS obtains the frame sequence number, carrier/timeslot channel number, and synchronization information from the common broadcast physical channel (BPCH) (see Table 1) and stores it in the processor 9-15. With the frame sequence number, carrier/timeslot channel number, and synchronization information thusly gleaned from the common broadcast physical channel (BPCH), the subscriber station SS can lock to the framing of its mobile telecommunications system $20_1$ and thereby discriminate between transmissions of mobile telecommunications system $20_1$ and the transmissions of other mobile telecommunications systems.

Figure 10:
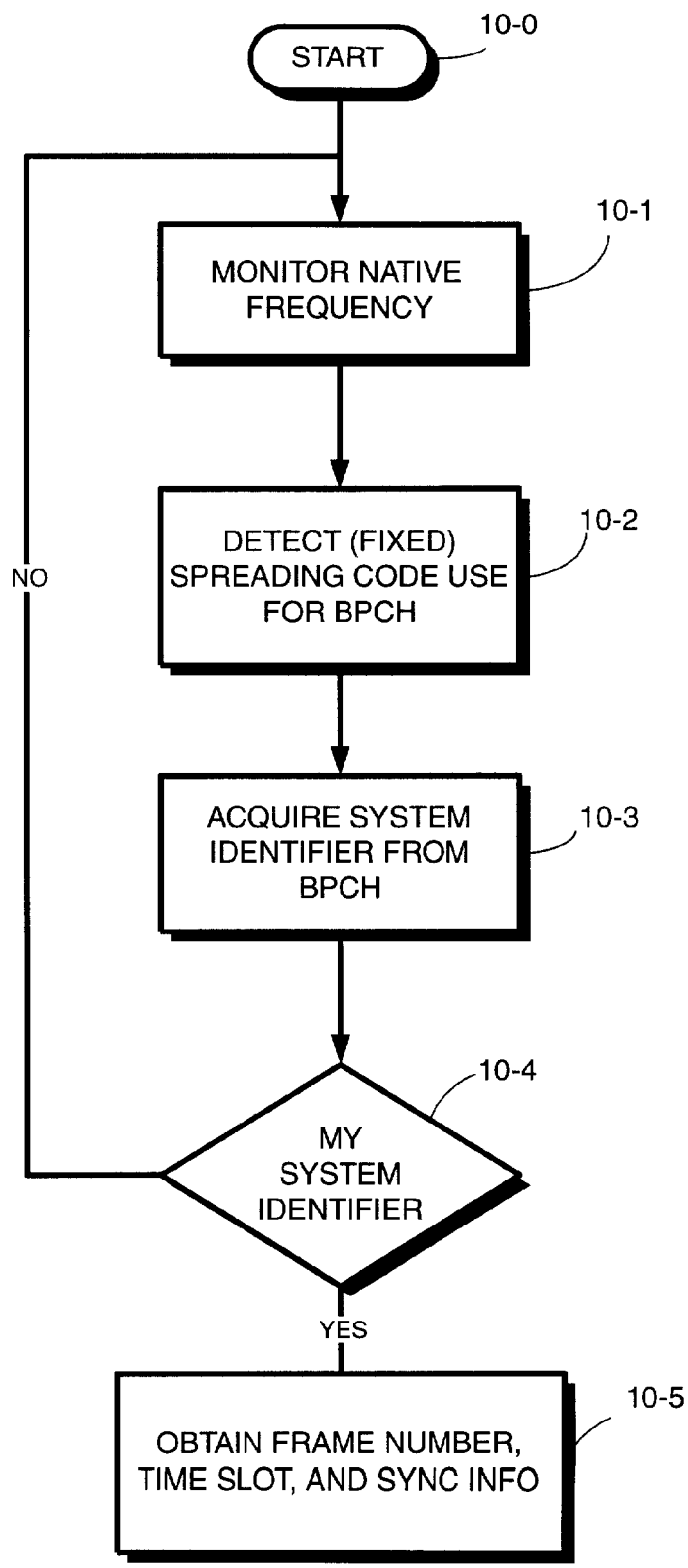
FIG. 10 is a flowchart showing general steps involved in a subscriber station channel discrimination scheme according to the present invention.
Figure 11:
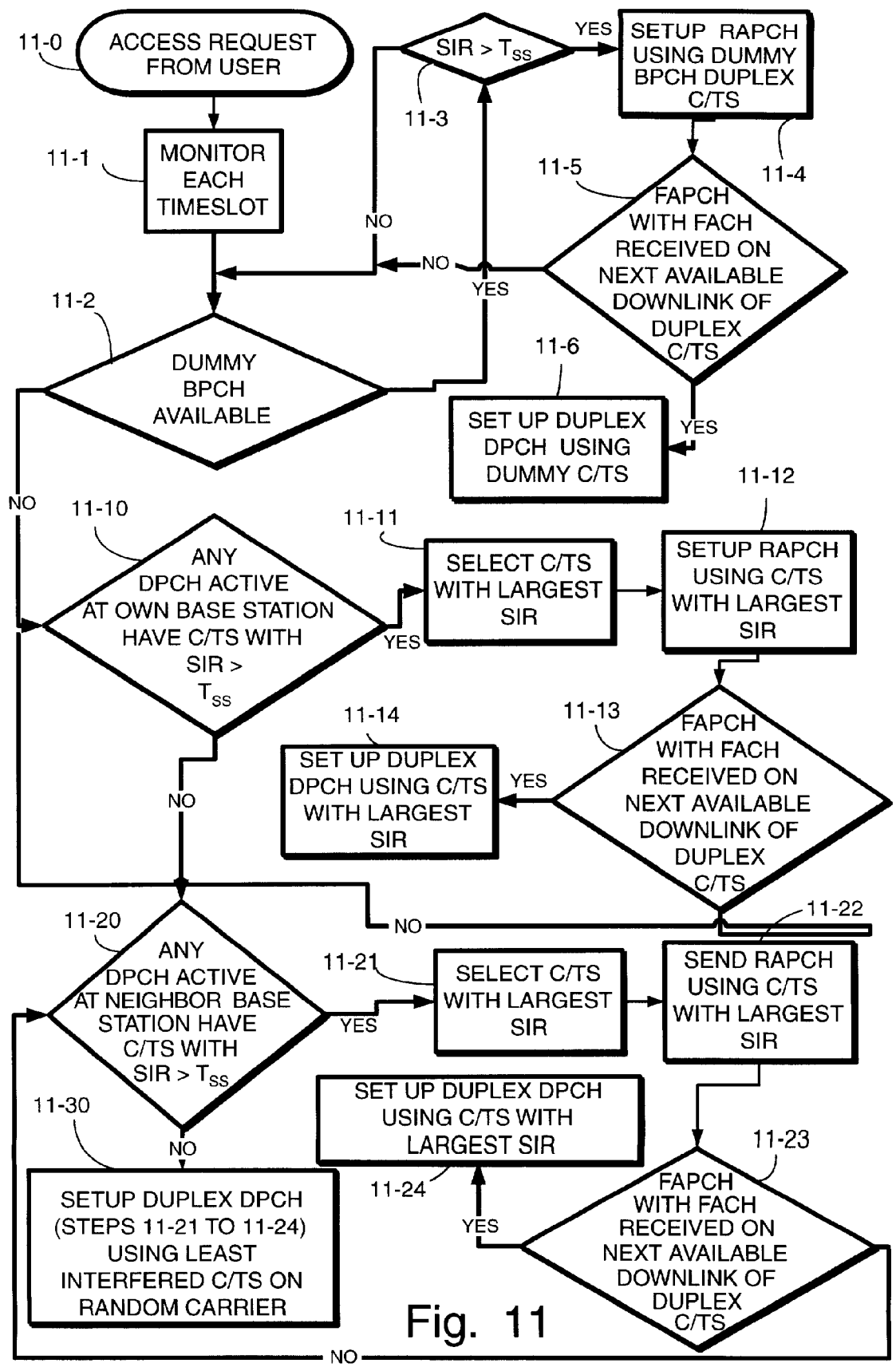
FIG. 11 is a flowchart showing general steps involved in a subscriber station channel selection scheme according to the present invention.

The foregoing description of the steps of FIG. 10 concerns the monitoring of a native frequency for detecting the common broadcast physical channel (BPCH), and thereby locking to the mobile telecommunications system to which subscriber station SS belongs. The present invention also provides a dynamic channel selection process as described below in conjunction with the basic steps illustrated in FIG. 11.

Step 11-0 of FIG. 1 shows processor 9-15 of subscriber station SS receiving a user request for radio access from user interface 9-30. Such user request for access can take the form of the user dialing a called party number and activating a send key on user interface 9-30. The user request may also be activation of the send key as response to a ring signal from the subscriber station being paged. At this juncture, the subscriber station SS is synchronized to its mobile telecommunications system $20_1$ in accordance with the procedure above described in connection with FIG. 10. Such being the case, at step 11-1 the processor 9-15 of subscriber station SS monitors each time slot of the frame. If it is determined at step 11-2 that the frame has a timeslot which carries a dummy common broadcast physical channel (BPCH) [see FIG. 8B], then at step 11-33 the subscriber station SS determines whether the timeslot selected at step 11-2 has a signal to interference ratio (SIR) which exceeds a predetermined minimum threshold $T_{SS}$ required by the subscriber station SS. The signal to interference ratio (SIR) is measured in receiver & demodulator 9-12. If the minimum threshold $T_{SS}$ is not exceeded, execution returns to step 11-2 to ascertain whether another carrier/timeslot channel carries a dummy common broadcast physical channel (BPCH), and if so the check of step 11-3 is repeated. Should it be determined at step 11-3 that the minimum threshold $T_{SS}$ is exceeded by a carrier/timeslot channel which carries a dummy common broadcast physical channel (BPCH), then at step 11-4 the subscriber station SS steps up a radio access request to the base station. The radio access request is carried over a random access physical channel (RAPCH) which is in the duplex pair with the carrier/timeslot channel which carried the dummy common broadcast physical channel (BPCH). For example, if the subscriber station SS selected the carrier/timeslot channel $CH_{1,1,4}$ in FIG. 8B that carried a dummy common broadcast physical channel (BPCH), the access request of step 11-4 is sent on a random access physical channel (RAPCH) carried in carrier/timeslot channel $CH_{1,1,12}$ (see FIG. 8B).

After the access request of step 11-4 is sent, at step 11-35 the processor 9-15 of subscriber station SS checks whether an affirmative response to the access request is received in a forward access physical channel (FAPCH) in the first available downlink carrier/timeslot channel of the duplex channel pair. In the foregoing illustration involving FIG. 8B, wherein the access request occurred of step 11-4 occurred in carrier/timeslot channel $CH_{1,1,12}$, the forward access physical channel (FAPCH) is expected at step 11-5 to be in carrier/timeslot channel $CH_{1,1,4}$, of the next frame. If an affirmative response from the base station to the access request is provided in the appropriate carrier/timeslot channel as determined at step 11-5, at step 11-6 the subscriber station SS sets up a duplex carrier/timeslot channel utilization.

In the duplex utilization set up at step 11-6, the uplink carrier/timeslot channel which carried the access request (e.g., carrier/timeslot channel $CH_{1,1,12}$ of FIG. 8B) is employed for the uplink dedicated physical channel (DPCH) for the connection, while the downlink carrier/timeslot channel which still carries the dummy common broadcast physical channel (BPCH) and carried the forward access physical channel (FAPCH) is employed as the downlink dedicated physical channel (DPCH) for the connection. In the illustrated embodiment, the messages sent prior to step 11-6 (i.e., prior to establishing the duplex carrier/timeslot channel utilization) are encoded with fixed spreading codes, but thereafter the spreading code native to the subscriber station SS is utilized so that the connection acquires one of the physical channels PCH as illustrated in FIG. 3. For example, on the uplink the connection may utilize physical channel $PCH_{1,1,12,1}$ (e.g., a physical channel PCH using the first spreading code of carrier/timeslot channel $CH_{1,1,12}$), and on the downlink the connection may utilize physical channel $PCH_{1,1,4,1}$ (e.g., a physical channel PCH using the first spreading code of carrier/timeslot channel $CH_{1,1,4}$).

In connection with step 11-5, before the base station sends an affirmative response to the access request of step 11-4, the base station must first determine whether the signal to interference ratio (SIR) as measured at the base station for the uplink carrier/timeslot channel involved in the request (e.g., carrier/timeslot channel $CH_{1,2,12}$) exceeds a minimum threshold $T_{BS}$. If the minimum threshold $T_{BS}$ is exceeded, the base station can send an affirmative response on the forward access physical channel (FAPCH) to the subscriber station SS. If the minimum threshold $T_{BS}$ is not exceeded, the base station does not respond to the access request. When the response is not received by subscriber station SS at step 11-5, the subscriber station SS returns to step 11-2 to hunt for another dummy common broadcast physical channel (BPCH).

If no dummy common broadcast physical channels (BPCH) exist, or if the carrier/timeslot channels of the existing dummy common broadcast physical channels (BPCH) are unusable, at step 11-10 the subscriber station SS detennines whether there are any active dedicated physical channels (DPCH), from the base station currently handling the subscriber station SS where the SIR on the related carrier/timeslot channel exceeds the minimum threshold $T_{SS}$ of subscriber station SS. If such carrier/timeslot channel exists, at step 11-1 the processor 9-15 of subscriber station SS selects the carrier/timeslot channel with the largest SIR.

Thereafter, the subscriber station SS sends its access request (at step 11-12) and checks for a response (at step 11-13) prior to setting up a new duplex DPCH using carrier/timeslot channel with the largest SIR (step 11-14). It will be appreciated that step 11-12, step 11-13, and step 11-14 are essentially identical to steps 11-4, 11-5, and 11-6, respectively, discussed above, but involve the carrier/timeslot channel having a dedicated physical channel (DPCH) with the largest SIR rather than a carrier/timeslot channel with dummy common broadcast physical is channel (BPCH).

If no answer to the access request is received by subscriber station SS from the base station at step 11-13, the subscriber station SS returns to step 11-10 to determine if there are any other carrier/timeslot channels with dedicated physical channels (DPCH) at its own base station which exceed the minimum threshold $T_{SS}$ of subscriber station SS. If such other carrier/timeslot channels exist, step 11-12, step 11-13, and step 11-14 are performed relative to the carrier/timeslot channel with dedicated physical channel (DPCH) with the next largest SIR.

If there are no qualifying carrier/timeslot channels with dedicated physical channels (DPCH) for the base station of the subscriber station SS as determined at step 11-10, at step 11-20 the subscriber station SS determines whether any carrier/timeslot channel with detectable dedicated physical channels (DPCH) from a neighboring base station exceed the minimum threshold $T_{SS}$ of subscriber station SS. If one or more such dedicated physical channels (DPCH) exist from the neighboring base station, step 11-21 through 11-24 are performed relative to the carrier/timeslot channel of such dedicated physical channel (DPCH). Steps 11-21 through 11-24 are essentially identical to step 11-12, step 11-13, and step 11-14, it being understood that steps 11-21 through 11-24 pertain to a carrier/timeslot channel with dedicated physical channel (DPCH) from a neighboring base station instead of the subscriber station SS's own base station (the base station to which the subscriber station is synchronized and locked).

If there are no qualifying carrier/timeslot channels with dedicated physical channels (DPCH) for a neighboring own system base station of the subscriber station SS as determined at step 11-10, at step 11-30 the subscriber station SS sets up a new duplex DPCH connection using a least interfered carrier/timeslot channel on a randomly selected carrier ($F_1$–$F_4$), if more than one carrier is supported by the base station to which the subscriber station SS is locked. The setting up of a new duplex DPCH connection is understood from comparable steps 22-21 through 11-24 described above.

The minimum threshold $T_{SS}$ at subscriber station SS and the minimum threshold $T_{BS}$ at the base station depend on several factors. These factors include the amount of processing gain, the number of connections already using the carrier/timeslot channel, and the performance of the specific method of detecting codes and discriminating between codes on the same carrier/timeslot channel. The optimum thresholds could be different for different services, and might be adapted from call to call dependent on type of call.

Thus, for call setup or handover, the subscriber station SS selects a least interfered duplex carrier/timeslot channel and makes direct DPCH setup (20 ms) via the random access physical channel (RAPCH) and forward access physical channel (FAPCH) on the duplex carrier/timeslot channel to the strongest base station. This provides quick DPCH access. The handover is decentralized and controlled by subscriber station SS. This avoids complex coordination or tricky channel selection requirements on the fixed infrastructure. The fact that the DPCH selection basically is made by the subscriber station SS does not prevent supplementary information like blind spot information or control from the system side.

The present invention thus provides an instant dynamic channel selection procedure for Direct Sequence CDMA mobile radio systems that have a TDMA component and/or multiple carriers (e.g., FDMA). By "instant" is meant that the channel selection is made in accordance with the need of a base station, e.g., on a per call or per connection basis. Advantageously, the selection is made by the handset, i.e., the subscriber station SS.

The instant dynamic channel selection of the present invention is based on defining the least interfered channel (LIC). For a duplex traffic channel, the least interfered channel (LIC) is the duplex carrier/timeslot channel pair in which the downlink as the lowest radio signal strength indicator (RSSI) of all carrier/timeslot channel pairs measured at the subscriber station SS. For a common broadcast physical channel (BPCH), or downlink simplex traffic channels, the least interfered channel (LIC) is the downlink of the duplex carrier/timeslot channel pair where the highest RSSI of any of the two slots of the carrier/timeslot channel pair has the lowest value of all carrier/timeslot channel pairs as measured at the base station. It is also possible, as an alternative for duplex (or up-link simplex) traffic channels to define the least interfered C/TS channel as the slots belonging to the duplex carrier/timeslot channel pair where the highest RSSI of any of the two slots of the carrier/timeslot channel pair has the lowest value of all carrier/timeslot channel pairs as measured at the subscriber station.

Efficient instant dynamic channel selection is based on the statistical law of large numbers. This means that there shall be as many choices as possible for selecting a good channel. A good channel is a channel that has a high probability to have a good enough signal to interference ratio (SIR), and also has a low probability of interfering with an existing connection in the same system or any other system. Efficient application of instant dynamic channel selection implies that setting up a new call sometimes will interfere with an already-existing call, which then will be forced to escape (e.g., make handover) to another carrier/timeslot channel. This is no problem so long as not only traffic channels, but also broadcast, synchronization, paging and access channels are dynamically selected (which occurs in the present invention).

Thus, in the present invention there is no specific carrier or carrier/timeslot channel for BPCH or RAPCH or FAPCH, in which case those could be interference so that the whole base station would be inoperable. A fixed position for these channels would force planning, as well as costly and impractical time synchronization between all systems.

Advantageously, the present invention makes the instant dynamic channel selection procedure independent of the amount of processing gain applied by the DS-CDMA coding process. More processing gain means that there can be more calls on the same time slot. The invention thus is pertinent for different and varying processing gain implemented on different channels and connections. To implement this feature down to very low processing gains (e.g., even down to 1), there may be a need for parts of common broadcast physical channel (BPCH) to be time multiplexed on dedicated physical channel (DPCH). This time multiplexing can be made within each slot, or be made over several slots as appropriate. Where the processing gain is low on some or all carrier/timeslot channels so that only one physical channel is allowed, the whole common broadcast physical channel (BPCH) has to be time multiplexed on dedicated physical channel (DPCH) on these carrier/timeslot channels. This permits common broadcast physical channel (BPCH) to be available on every active carrier/timeslot channel. In such circumstances, the procedure of FIG. 11 would be streamlined by bypassing the checks of 11-10 and 11-20. It in this regard, the forward access physical channel (FAPCH) would also have to be similarly time multiplexed.

The present invention also advantageously allows coexistence of uncoordinated installations of DS-CDMA mobile radio systems on a common spectrum allocation. The invention is primarily intended for, but not limited to, numerous residential and office systems applied in the same geographical area. For example, the mobile telecommunications systems $20_1$–$20_3$ shown in FIG. 2 can be operated by different companies or institutions which are all geographically located within an office park or technology zone. The invention can also be applied on a spectrum exclusively allocated for one public operator, or on a common (e.g., unlicensed) allocation available for a multitude of operators.

The present invention thus enables efficient deployment of different geographical overlapping DS-CMDA systems by letting the connections of the different systems make use of different carrier/timeslot channels. The different carrier/timeslot channels provide the necessary isolation between the radio connections of the different systems, with the instant dynamic channel selection procedure of the present invention being used for selecting the proper carrier/timeslot channel.

Yet another advantage of the present invention is that can coexist with proper classes of multi-carrier (MC) TDMA systems which use instant dynamic channel selection.

In one particular example implementation, the four radio frequency carriers $F_1$–$F_4$ are provided in the frequency range of 1900–1920 MHz. The invention is not limited to the use of four radio frequency carriers, nor the provision of sixteen timeslots per radio frequency carrier. It will be appreciated that a greater or lesser number of radio frequency carriers can be employed, as well as a greater or lesser number of timeslots per radio frequency carrier. In fact, the present invention can be practiced even if only one radio frequency carrier is employed by a mobile telecommunications system.

The embodiments illustrated herein have fixed spreading codes for the common broadcast physical channel (BPCH), random access physical channel (RAPCH), and forward access physical channel (FAPCH). Fixed spreading codes are predetermined DS-CDMA codes which can be immediately applied to these physical channels for decoding and encoding, thereby providing some advantage. It should be understood, however, that the present invention encompasses embodiments in which variable spreading codes are also allowed on these physical channels.

Whereas FIG. 9 has shown components of a subscriber station SS, for the purposes of the present invention it should be understood that similar components can reside in an embodiment of the base station. In such base station embodiment, the processor controls the base station and executes application logic appropriate for the base station, and is connected to a base station user interface.

The embodiments illustrated herein CDMA mobile telecommunications systems with a TDMA component. However, it should also be understood that the TDMA component is not necessary, and that the principles of the invention can also be applied for CDMA with only a FDMA component. That is, while the instant dynamic channel selection as described herein is generally applied both in the frequency and time domains, the invention is equally applicable if only one of those domains is available.

As illustrated above, instant dynamic channel selection is an advantageous feature of the present invention. The instant dynamic channel selection of the present invention enables, on average, channel reuse at a shorter geographical distance than fixed channel allocation (FCA) can provide for the same specific blocking probability, whereby the locally available interference limited traffic capacity is increased compared to fixed channel allocation (FCA). However, it should be understood that aspects of the present invention can performed using fixed channel allocation (FCA) instead. Thus, features of the present invention which do not necessarily require instant dynamic channel selection are not to be construed as requiring instant dynamic channel selection.

Although various duplex schemes have been shown, in accordance with the present invention each timeslot on a carrier, e.g., each carrier/timeslot channel, can be allocated to either downlink or uplink. With such flexibility, the TDD mode can be adapted to different environments and different development scenarios. In any configuration, at least one time slot on one carrier has to be allocated for the downlink and at least one time slot on th e carrier has to be allocated for the up link.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system comprising at least one base station which communicates over an air interface with a subscriber station, wherein radio transmission access in the telecommunications system utilizes code division multiple access (CDMA) with a time division multiple access (TDMA) component; wherein a common broadcast physical channel is broadcast from the base station at least on each active carrier/timeslot combination; and wherein the common broadcast physical channel includes (1) broadcast system identity information and (2) paging information.

2. The system of claim 1, wherein for the base station there are always at least two common broadcast physical channels active on different timeslots.

3. The system of claim 2, wherein the base station creates a dummy common broadcast physical channel on a least interfered timeslot.

4. The system of claim 1, wherein the base station puts the two common broadcast physical channels on active traffic timeslots, but if there are less than two active traffic timeslots the base station creates a dummy common broadcast physical channel on a least interfered non-traffic timeslot.

5. The system of claim 3, wherein the base station monitors to ensure that the dummy common broadcast physical channel remains on a least interfered timeslot, and if not relocates the dummy common broadcast physical channel to the least interfered timeslot.

6. The system of claim 1, wherein a fixed direct sequence CDMA code is employed for the common broadcast physical cal channel.

7. The system of claim 1, wherein the subscriber station selects a carrier/timeslot for sending an access request to the base station.

8. The system of claim 7, wherein the carrier/timeslot selected by the subscriber station for sending an access request to the base station is also used for a traffic channel.

9. The system of claim 7, wherein the subscriber station selects a least interfered carrier/timeslot as the carrier/timeslot for sending an access request to the base station.

10. The system of claim 9, wherein the broadcast system identity further includes an identification of the base station of the telecommunications system to which the subscriber belongs.

11. The system of claim 7, wherein upon receipt of the access request, for an accepted access request the base station sends an answer on a next down-link carrier/timeslot included in a duplex pair with the carrier/time slot which the subscriber station selected for sending the access request to the base station.

12. The system of claim 7, wherein the subscriber station selects a least interfered uplink carrier/timeslot as the carrier/timeslot for sending an access request to the base station must be above a first predetermined threshold, and wherein a duplex paired downlink carrier/timeslot for the selected uplink carrier/timeslot must be above a second predetermined threshold as measured at the base station.

13. The system of claim 12, wherein in selecting the least interfered uplink carrier/timeslot as the carrier/timeslot for sending an access request to the base station, the subscriber station utilizes the following priority:
   (1) a duplex carrier/timeslot channel having a dummy common broadcast channel;
   (2) a duplex carrier/timeslot channel having an active traffic channel of the base station closest to the subscriber station;
   (3) a duplex carrier/timeslot channel having an active traffic channel of a neighboring base station
   a least interfered duplex carrier/timeslot channel on a random carrier.

14. The system of claim 1, wherein at an given moment a connection between the base station and the subscriber station is borne on a physical channel of the system, the physical channel being defined by a code, timeslot, and frequency.

15. The system of claim 1, wherein the broadcast system identity includes information which enables the subscriber station distinguish the telecommunications system to which the subscriber belongs from any other telecommunications system operating in a same geographical area, and whereby the subscriber station uses the broadcast system identity for framing transmissions from the telecommunications system to which the subscriber belongs.

16. A method of operating a telecommunications system comprising at least one base station which communicates over an air interface with a subscriber station, the method comprising:
   using code division multiple access (CDMA) with a time division multiple access (TDMA) component for radio transmission access in the telecommunications system;
   broadcasting a common broadcast physical channel from the base station at least on each active carrier/timeslot combination; and
   including in the common broadcast physical channel (1) broadcast system identity information and (2) paging information.

17. The method of claim 16, further comprising maintaining, for the base station, at least two common broadcast physical channels active on different timeslots.

18. The method of claim 17, further comprising the base station putting the two common broadcast physical channels on active traffic timeslots, but if there are less than two active traffic timeslots the base station creates a dummy common broadcast physical channel on a least interfered non-traffic timeslot.

19. The method of claim 18, further comprising the base station monitoring to ensure that the dummy common broadcast physical channel remains on a least interfered timeslot, and if not relocating the dummy common broadcast physical channel to the least interfered timeslot.

20. The method of claim 16, further comprising the base station creating a dummy common broadcast physical channel on a least interfered timeslot.

21. The method of claim 16, further comprising employing a fixed direct sequence CDMA code for the common broadcast physical channel.

22. The method of claim 16, further comprising the subscriber station selecting a carrier/timeslot for sending an access request to the base station.

23. The method of claim 22, further comprising also using, for a traffic channel, the carrier/timeslot selected by the subscriber station for sending an access request to the base station.

24. The method of claim 22, further comprising the subscriber station selecting a least interfered carrier/timeslot as the carrier/timeslot for sending an access request to the base station.

25. The method of claim 24, wherein the subscriber station selecting a least interfered uplink carrier/timeslot as the carrier/timeslot for sending an access request to the base station includes requiring the selected carrier/timeslot being above a first predetermined threshold, and wherein a duplex paired downlink carrier/timeslot for the selected uplink carrier/timeslot must be above a second predetermined threshold as measured at the base station.

26. The method of claim 25, wherein in the step of selecting the least interfered uplink carrier/timeslot as the carrier/timeslot for sending an access request to the base station, the subscriber station utilizes the following priority:
   (1) a duplex carrier/timeslot channel having a dummy common broadcast channel;
   (2) a duplex carrier/timeslot channel having an active traffic channel of the base station closest to the subscriber station;
   (3) a duplex carrier/timeslot channel having an active traffic channel of a neighboring base station
   a least interfered duplex carrier/timeslot channel on a random carrier.

27. The method of claim 22, further comprising sending from the base station, upon receipt of the accepted access request, an answer on a next down-link carrier/timeslot included in a duplex pair with the carrier/time slot which the subscriber station selected for sending the access request to the base station.

28. The method of claim 16, wherein at an given moment a connection between the base station and the subscriber station is borne on a physical channel of the system, the physical channel being defined by a code, timeslot, and frequency.

29. The method of claim 16, further comprising the subscriber station using the broadcast system identity information to distinguish the telecommunications system to which the subscriber belongs from any other telecommunications system operating in a same geographical area.

30. The method of claim 29, further comprising the subscriber station using the broadcast system identity information for framing transmissions in the telecommunications system to which the subscriber belongs.

31. A method of operating a first telecommunications system which has at least partially geographically overlapping coverage with a second telecommunications system, the first telecommunications system having at least one first system base station which communicates over an air interface with a first system subscriber station, wherein radio transmission access in the first telecommunications system utilizes code division multiple access (CDMA) with a time division multiple access (TDMA) component; the method comprising:

broadcasting a common broadcast physical channel from the first system base station at least on an active carrier/timeslot combination, the common broadcast physical channel including broadcast system identity information; and using the broadcast system identity information at the first system subscriber station to distinguish between transmissions of the first telecommunications system and the second telecommunications system.

32. The method of claim 31, further comprising using the broadcast system identity information at the first system subscriber station for framing transmissions in the first telecommunications system.

33. The method of claim 31, further comprising further including paging information in the common broadcast physical channel.

34. The method of claim 33, further comprising the first system base station creating a dummy common broadcast physical channel on a least interfered timeslot.

35. The method of claim 31, further comprising maintaining, for the first system base station, at least two common broadcast physical channels active on different timeslots.

36. The method of claim 35, further comprising the first system base station putting the two common broadcast physical channels on active traffic timeslots, but if there are less than two active traffic timeslots the base station creates a dummy common broadcast physical channel on a least interfered non-traffic timeslot.

37. The method of claim 36, further comprising the first system base station monitoring to ensure that the dummy common broadcast physical channel remains on a least interfered timeslot, and if not relocating the dummy common broadcast physical channel to the least interfered timeslot.

38. The method of claim 31, further comprising employing a fixed direct sequence CDMA code for the common broadcast physical channel.

39. The method of claim 31, further comprising the first system subscriber station selecting a carrier/timeslot for sending an access request to the first system base station.

40. The method of claim 31, further comprising also using, for a traffic channel, the carrier/timeslot selected by the first system subscriber station for sending an access request to the first system base station.

41. The method of claim 40, further comprising the first system subscriber station selecting a least interfered carrier/timeslot as the carrier/timeslot for sending an access request to the first system base station.

42. The method of claim 40, further comprising sending from the first system base station, upon receipt of the accepted access request, an answer on a next down-link carrier/timeslot included in a duplex pair with the carrier/time slot which the first system subscriber station selected for sending the access request to the first system base station.

43. The method of claim 31, wherein at an given moment a connection between the first system base station and the first system subscriber station is borne on a physical channel of the first telecommunications system, the physical channel being defined by a code, timeslot, and frequency.

44. A first telecommunications system which has at least partially geographically overlapping coverage with a second telecommunications system, wherein radio transmission access in the first telecommunications system utilizes code division multiple access (CDMA) with a time division multiple access (TDMA) component; the first telecommunications system comprising:

the first telecommunications system having at least one first system base station which communicates over an air interface with a first system subscriber station, the first system base station broadcasting a common broadcast physical channel on at least an active carrier/timeslot combination, the common broadcast physical channel including broadcast system identity information; and a first system subscriber station which uses the broadcast system identity information to distinguish between transmissions of the first telecommunications system and the second telecommunications system.

45. The apparatus of claim 44, wherein the first system subscriber station uses the broadcast system identity information framing transmissions in the first telecommunications system.

46. The apparatus of claim 44, wherein the first system base station further includes paging information in the common broadcast physical channel.

47. The apparatus of claim 44, wherein the first system base station broadcasts at least two common broadcast physical channels active on different timeslots.

48. The apparatus of claim 47, wherein the first system base station puts the two common broadcast physical channels on active traffic timeslots, but if there are less than two active traffic timeslots the base station creates a dummy common broadcast physical channel on a least interfered non-traffic timeslot.

49. The apparatus of claim 48, wherein the first system base station monitors to ensure that the dummy common broadcast physical channel remains on a least interfered timeslot, and if not relocates the dummy common broadcast physical channel to the least interfered timeslot.

50. The apparatus of claim 44, wherein the first system base station creates a dummy common broadcast physical channel on a least interfered timeslot.

51. The apparatus of claim 44, wherein a fixed direct sequence CDMA code is employed for the common broadcast physical channel.

52. The apparatus of claim 44, wherein the first system subscriber station selects a carrier/timeslot for sending an access request to the first system base station.

53. The apparatus of claim 52, wherein the carrier/timeslot selected by the first system subscriber station for sending an access request to the first system base station is also used for a traffic channel.

54. The apparatus of claim 52, wherein the first system subscriber station selects a least interfered carrier/timeslot as the carrier/timeslot for sending an access request to the first system base station.

55. The apparatus of claim 52, wherein the first system base station sends, upon receipt of the accepted access request, an answer on a next down-link carrier/timeslot included in a duplex pair with the carrier/time slot which the first system subscriber station selected for sending the access request to the first system base station.

56. The apparatus of claim 52, wherein at an given moment a connection between the first system base station and the first system subscriber station is borne on a physical channel of the first telecommunications system, the physical channel being defined by a code, timeslot, and frequency.

57. A telecommunications system comprising at least one base station which communicates over an air interface with a subscriber station, wherein radio transmission access in the telecommunications system utilizes code division multiple access (CDMA) with a time division multiple access (TDMA) component; wherein a duplex channel comprises an uplink carrier/timeslot combination paired with a downlink carrier/timeslot combination with a defined time relation, wherein a carrier/timeslot combination utilized by the subscriber station for an access request and the carrier/timeslot combination utilized by the base station for the access request response shall utilize the same duplex channel as the following uplink and downlink dedicated physical channels used for a connection between the subscriber station and the base station, and wherein a CDMA code is employed for the dedicated physical channels.

58. The system of claim 57, wherein the access request and the access request response are encoded with a fixed spreading code.

59. The system of claim 57, wherein the dedicated physical channels are encoded with a spreading code native to the subscriber station.

60. The system of claim 57, wherein the carrier/timeslot combination utilized by the base station for access request response also carries a common broadcast physical channel, and wherein the common broadcast physical channel includes (1) broadcast system identity information and (2) paging information.

61. The system of claim 60, wherein a CDMA code is employed for the common broadcast physical channel.

62. A method of operating a telecommunications system comprising at least one base station which communicates over an air interface with a subscriber station, the method comprising:

the subscriber station sending an access request to the base station;

the base station sending an access request response to the subscriber station;

using code division multiple access (CDMA) with a time division multiple access (TDMA) component for radio transmissions in the telecommunications system;

wherein a carrier/timeslot combination utilized by the subscriber station for the access request and a carrier/timeslot combination utilized by the base station for the access request response are also utilized respectively as uplink and downlink dedicated physical channels for a connection between the subscriber station and the base station;

and wherein a CDMA code is employed for the dedicated physical channels.

63. The method of claim 62, further comprising encoding the access request and the access request response with a fixed spreading code.

64. The method of claim 62, further comprising encoding the dedicated physical channels with a spreading code native to the subscriber station.

65. The method of claim 62, further comprising carrying on the carrier/timeslot combination utilized by the base station for access request response a common broadcast physical channel, the common broadcast physical channel including (1) broadcast system identity information and (2) paging information.

66. The system of claim 65, wherein a CDMA code is employed for the common broadcast physical channel.

* * * * *